(12) United States Patent
Wise et al.

(10) Patent No.: US 6,975,505 B2
(45) Date of Patent: Dec. 13, 2005

(54) ELECTRICAL SERVICE ENTRANCE WITH NEUTRAL

(75) Inventors: Randall D. Wise, New Ulm, MN (US); Steven C. Stenzel, Good Thunder, MN (US)

(73) Assignee: General Electric Company, Schenectady, NY (US)

(*) Notice: Subject to any disclaimer, the term of this patent is extended or adjusted under 35 U.S.C. 154(b) by 1 day.

(21) Appl. No.: 10/743,849

(22) Filed: Dec. 22, 2003

(65) Prior Publication Data
US 2005/0136734 A1 Jun. 23, 2005

(51) Int. Cl.[7] ................................................ H02B 1/00
(52) U.S. Cl. ...................... 361/664; 361/665; 361/668; 439/517
(58) Field of Search ................................ 361/659–661, 361/663–670, 672; 174/38, 52.1

(56) References Cited

U.S. PATENT DOCUMENTS

| | | | | |
|---|---|---|---|---|
| 3,691,288 A | * | 9/1972 | Sturdivan | ..................... 174/38 |
| 4,025,825 A | * | 5/1977 | Shrader | ....................... 361/670 |
| 5,378,058 A | * | 1/1995 | Tessmer | ....................... 312/298 |
| 5,404,266 A | * | 4/1995 | Orchard et al. | ............. 361/667 |
| 5,627,724 A | * | 5/1997 | Leach et al. | ................ 361/663 |
| 5,870,276 A | | 2/1999 | Leach et al. | ................ 361/627 |

* cited by examiner

Primary Examiner—Boris Chérvinsky
(74) Attorney, Agent, or Firm—Cantor Colburn LLP

(57) ABSTRACT

A service entrance includes a post section, a service section, and a neutral bus disposed therebetween. The post section includes a first opening and a second opening, and is adapted to receive an electrical supply wire having a supply power wire and a supply neutral wire. The service section is disposed at the post section, and includes a third opening and a fourth opening, wherein the third opening is juxtaposed the first opening and the fourth opening is juxtaposed the second opening. The neutral bus, having a first end at the post section and a second end at the service section, is disposed passing through the second and fourth openings. The first end of the neutral bus is adapted to electrically connect with the supply neutral wire.

17 Claims, 3 Drawing Sheets

ELECTRICAL SERVICE ENTRANCE WITH NEUTRAL

BACKGROUND OF THE INVENTION

The present disclosure relates generally to an electrical service entrance, and particularly to an electrical service entrance with a neutral connection.

An electrical service entrance provides an enclosure for electrically connecting a utility supply circuit with a branch load circuit, and may include electrical meters, electrical main circuit disconnects, and electrical branch circuit disconnects. The power provided by the utility company may be single-phase or multi-phase, and in an exemplary arrangement may be provided with about 200 Amps of service at about 120/240 VAC. An exemplary type of electrical service entrance may be used for supplying temporary power at a construction site for example, or for supplying permanent power at a mobile home site for example. In such an exemplary service entrance, power from the utility company may be fed from under the ground to a post section, and then delivered through various electrical connections to a service section. These electrical connections may be quite involved, may include multiple electrical components, and may require extensive wire routing. In an effort to keep material and labor costs under control, service entrance units have adopted modular layouts and neutral bus arrangements. However, there remains a need in the art for an electrical service entrance unit that provides for even lower material and labor costs and reduced wiring congestions.

SUMMARY OF THE INVENTION

A service entrance includes a post section, a service section, and a neutral bus disposed therebetween. The post section includes a first opening and a second opening, and is adapted to receive an electrical supply wire having a supply power wire and a supply neutral wire. The service section is disposed at the post section, and includes a third opening and a fourth opening, wherein the third opening is juxtaposed the first opening and the fourth opening is juxtaposed the second opening. The neutral bus, having a first end at the post section and a second end at the service section, is disposed passing through the second and fourth openings. The first end of the neutral bus is adapted to electrically connect with the supply neutral wire.

A service entrance includes a first housing and a second housing proximate thereto, the first and second housings having first and second openings disposed therebetween. A neutral bus having a first end at the first housing and a second end at the second housing is disposed passing through the second opening. The first housing is adapted to receive an electrical supply wire having a supply path and a return neutral path, the first opening is adapted to receive the supply path, and the second opening is adapted to receive the return neutral path.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides an electrical service entrance having a post section and a service section, where an electrical supply path passes between the two sections via a first opening and an electrical return neutral path passes between the two sections via a second different opening that is positioned below the first opening. While embodiments described herein depict square metal enclosures as exemplary housings for the post and service sections, it will be appreciated that the disclosed invention is also applicable to other types of housings, such as tubular plastic housings or molded housings for example.

Figure 1:
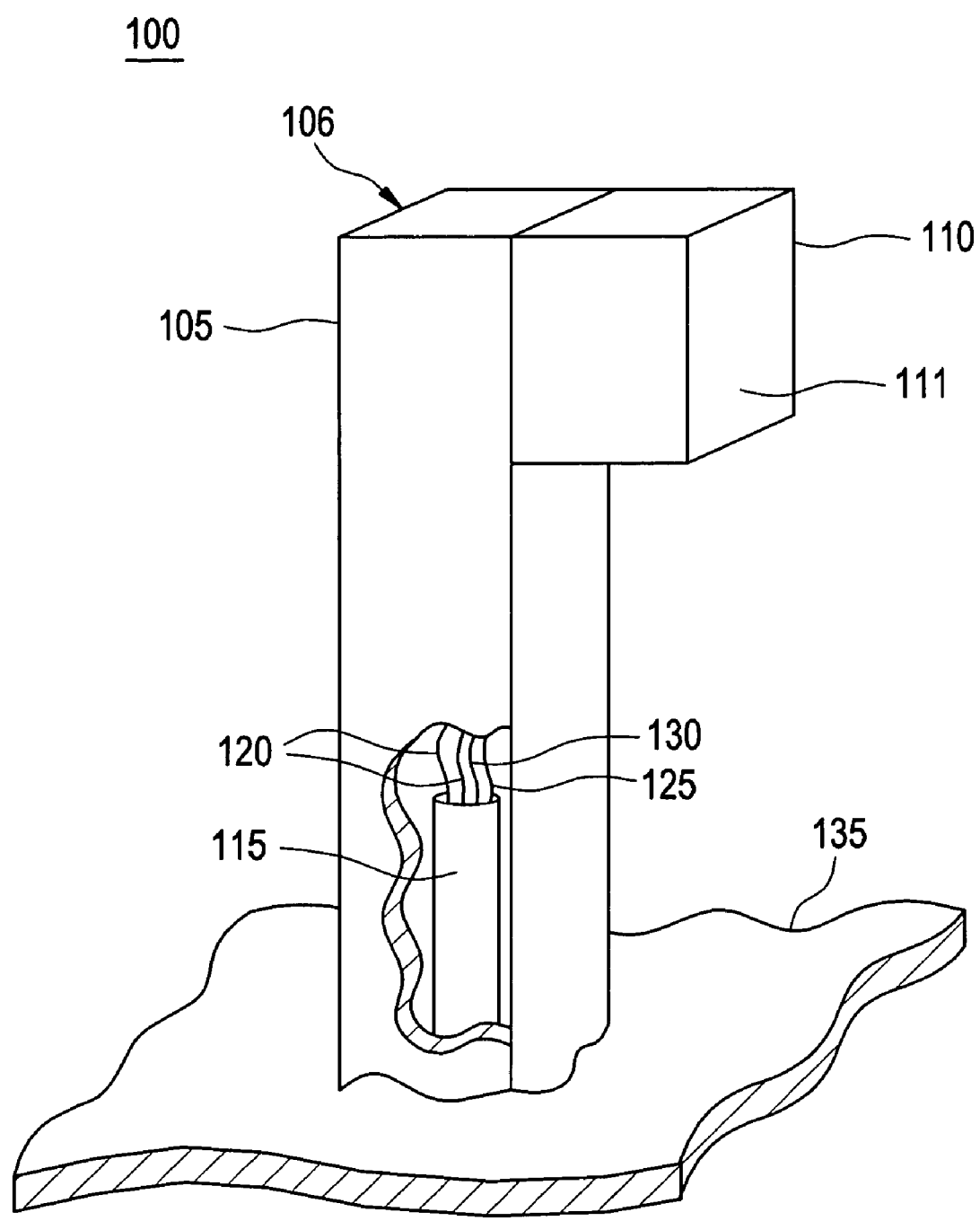
FIG. 1 depicts an exemplary service entrance having a post section and a service section in accordance with embodiments of the invention.

FIG. 1 is an exemplary embodiment of a service entrance 100 having a post section 105 and a service section 110 arranged in a back-to-back fashion with the front of each denoted by 106 and 111, respectively. Post section 105 is adapted to receive an electrical supply wire 115 having a supply power wire 120, a supply neutral wire 125, and a supply ground wire 130. In an embodiment, post section 105 is anchored to the ground 135, and electrical supply wire 115 is provided to post section 105 via an underground channel (not shown). In an alternative embodiment, electrical supply wire 115 may be delivered to post section 105 via an overhead arrangement having a weather head. While FIG. 1 depicts supply power wire 120 having two supply paths, thereby denoting a single-phase arrangement with phase-to-phase and phase-to-neutral voltages, it will be appreciated that supply power wire 120 may have three supply paths for a three-phase arrangement.

Figure 2:
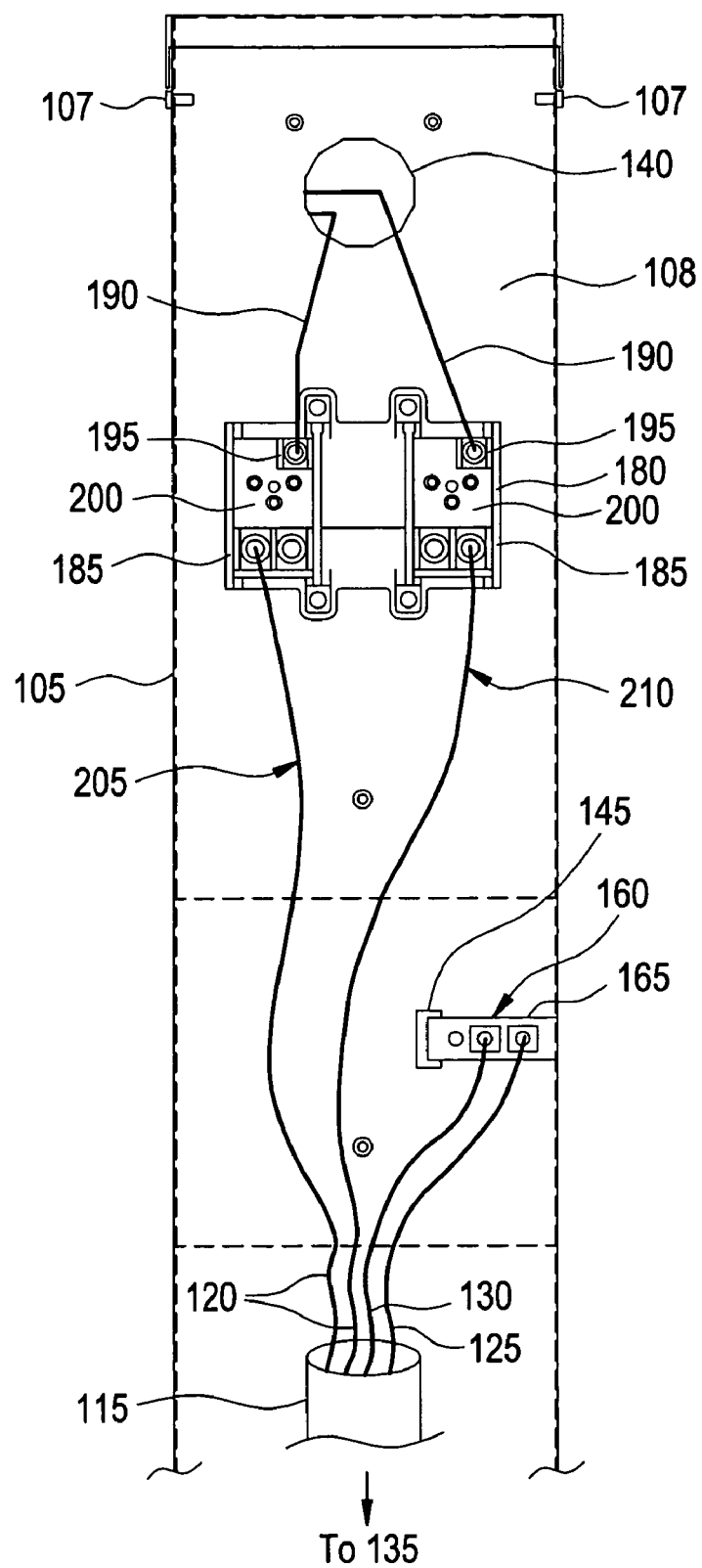
FIG. 2 depicts a front view of the post section of FIG. 1 with cover removed for clarity.
Figure 3:
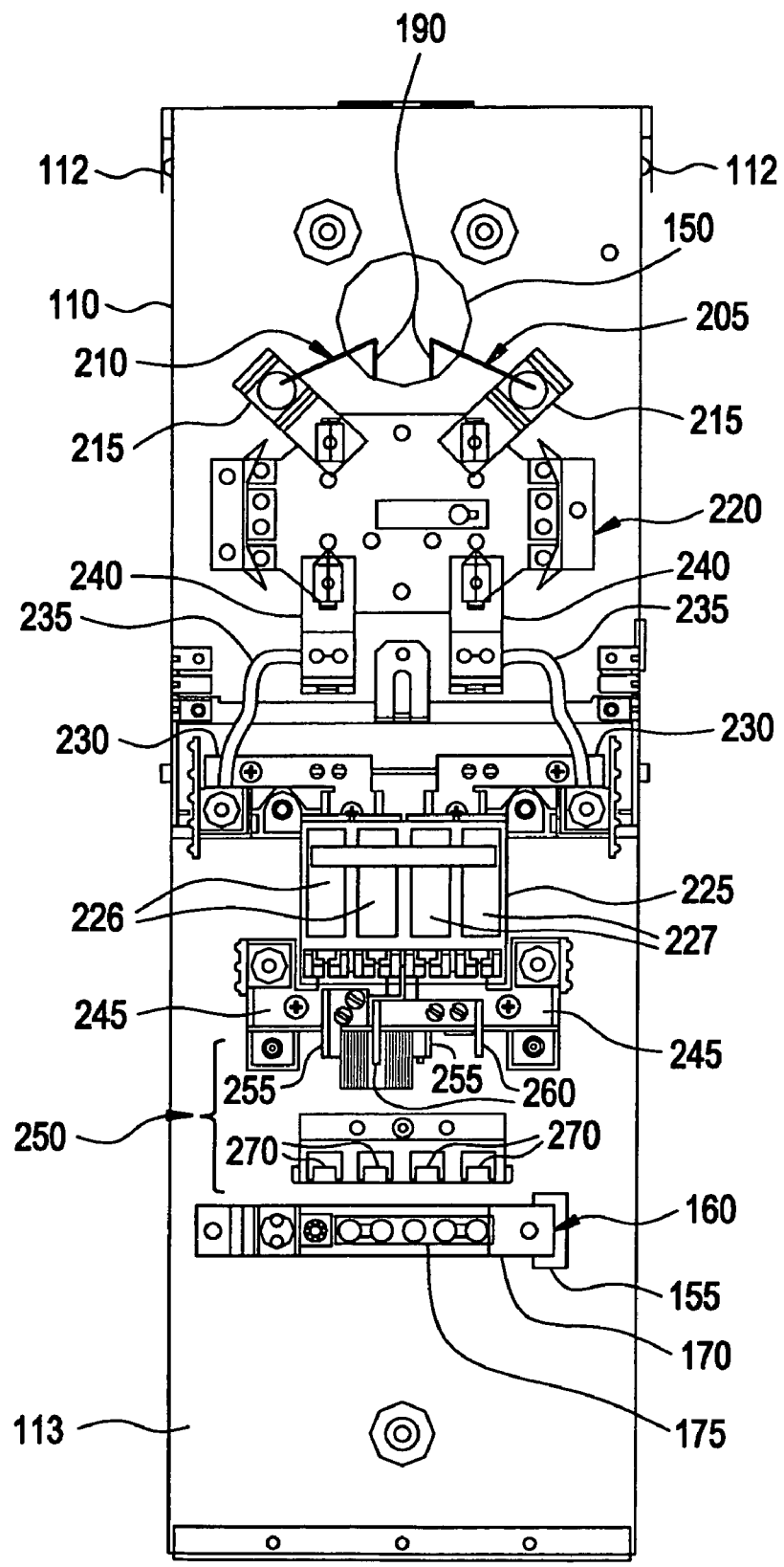
FIG. 3 depicts a front view of the service section of FIG. 1 with cover removed for clarity.

Reference is now made to FIGS. 2 and 3, which depict front views of post section 105 and service section 110, respectively, with covers removed to show the internal configuration of each. In an embodiment, post section 105 is a box-like structure having a removable cover that may pivot at a top hinge 107, and includes a first opening 140 and a second opening 145 on a back surface 108. In an embodiment, service section 110 is a box-like structure having a removable cover that may pivot at a top hinge 112, and includes a third opening 150 and a fourth opening 155 on a back surface 113. Third opening 150 of service section 110 is juxtaposed first opening 140 of post section 105, and fourth 155 is juxtaposed second opening 145, thereby providing two through-openings between post section 105 and service section 110, which are arranged in a back-to-back rain-tight fashion, as depicted in FIG. 1. As used herein, the term rain-tight denotes an arrangement that is not necessarily impervious to water, but is sufficiently water-proof to enable service entrance 100 to comply with local electrical codes, standards and regulations, for outdoor application. Passing through second and fourth openings 145, 155, is a neutral bus 160, which has a first end 165 disposed at post section 105, and a second end 170 disposed at service section 110. Second end 170 is electrically connected to a service neutral connector 175 at service section 110, and in application, first end 165 is electrically connected to supply neutral wire 125 at post section 105.

Referring to FIG. 2, a terminal block 180 is attached to back surface 108 of post section 105 proximate first opening 140 for receiving supply power wires 120 at one set of lugs 185, and for receiving a pair of jumper power wires 190 at a second set of lugs 195. A pair of connector plates 200 connect the respective lugs 185 and lugs 195. As can be seen in FIG. 2, two power supply paths 205 and 210 are depicted, with each path being electrically isolated from the other. The first supply path 205 includes supply power wire 120 having a first phase voltage, lug 185, connector plate 200, lug 195, and jumper power wire 190. The second supply path 210 is identical to the first supply path 205, but at a different phase voltage. In an embodiment, the phase-to-neutral voltage of first supply path 205 is 120 VAC (volts alternating current), the phase-to-neutral voltage of second supply path 210 is 120 VAC, and the phase-to-phase voltage between first and second supply paths 205, 210 is 240 VAC. Alternative embodiments may employ different voltages, and may employ three-phase or multi-phase configurations.

Referring now to FIG. 3, a pair of power connectors 215, one in the first supply path 205 and the other in the second supply path 210, are disposed proximate third opening 150 of service section 110 and provide a means for electrically connecting jumper power wires 190 to a first receptacle 220 that is adapted to receive an electric meter (not shown). Jumper power wires 190 pass from post section 105 to service section 110 through first and third openings 140, 150. In an exemplary embodiment, terminal block 180 is absent an electrical connection with supply neutral wire 125, and first and third openings 140, 150 are absent a jumper neutral wire between post section 105 and service section 110, as supply neutral wire 125 is electrically connected to first end 165 of neutral bus 160 at post section 105, which will be discussed in more detail later.

A main circuit disconnect 225, such as a two-phase circuit breaker for example, is attached to, but in electrical isolation with, back surface 113 of service section 110, and is electrically connected with first receptacle 220 via line straps 230, line conductors 235, and meter load terminals 240. The load side of main circuit disconnect 225 is electrically connected with load straps 245, which in turn feed power to a second receptacle 250 that is adapted for receiving at least one branch circuit disconnect (not shown). In an embodiment, and as depicted in FIG. 3, main circuit disconnect 225 may be a two-phase four-pole circuit breaker, with each phase path, alternatively supply path, 205, 210, receiving and delivering power through two poles of the four-pole circuit breaker. The A-phase poles 226 in supply path 210 are electrically connected in parallel via A-phase line strap 230 and A-phase load strap 245, which in turn are electrically connected with A-phase stabs 255 at second receptacle 250. A similar arrangement applies to the B-phase poles 227 in supply path 205, which are connected in parallel via B-phase line strap 230 and B-phase load strap 245. B-phase load strap 245 is electrically connected with B-phase stabs 260 at second receptacle 250. As depicted in FIG. 3, the A and B-phase stabs 255, 260 alternate from left to right. While an embodiment of the invention is depicted having a two-phase four-pole circuit breaker as a main circuit disconnect 225, it will be appreciated that other configurations may be employed, such as a two-phase two-pole circuit breaker for example.

In addition to A and B-phase stabs 255, 260, second receptacle 250 also includes a branch circuit support 265, having hooks 270, that is connected to back surface 113 of service section 110. In application, branch circuit disconnects (not shown) clip onto hooks 270 and plug onto stabs 255, 260, thereby providing an electrical path for feeding a plurality of branch circuits. Power is supplied to each branch circuit by electrically connecting a branch hot wire (not shown) to the load side of a branch circuit disconnect. A return neutral wire and ground wire (not shown) from the load are electrically connected to the service neutral connector 175, thereby providing a return electrical path.

As discussed earlier, service neutral connector 175 is electrically connected with second end 170 of neutral bus 160, which passes through second and fourth openings 145, 155 to post section 105. First end 165 of neutral bus 160 provides a means for electrically connecting the return neutral and ground wires from the load with the supply neutral wire 125 and supply ground wire 130 from the electrical supply wire 115, thereby completing the electrical return neutral and ground paths.

In an exemplary embodiment, supply neutral wire 125 is directly electrically connected with service neutral connector 175 via electrical connections at first end 165 and second end 170 of neutral bus 160, thereby minimizing the number of electrical connections and number of electrical components in the return neutral path. In a further exemplary embodiment, second and fourth openings 145, 155 are disposed below first and third openings 140, 150, and service neutral connector 175 is disposed below second receptacle 250, thereby providing a neutral connection arrangement that is below live parts for ease of wiring installation.

As a result of having fewer electrical connections and fewer electrical components in the return neutral path, and of having the service neutral connector 175 disposed below the second receptacle 250, as opposed to running longitudinally down the side of the service section 110 from the first receptacle 220 to the second receptacle 250, service entrance 100 benefits from reduced material and labor cost and reduced wiring congestion.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A service entrance, comprising:
   a post section adapted to receive an electrical supply wire having a supply power wire and a supply neutral wire, the post section having a first opening and a second opening, and a first terminal disposed proximate the first opening;
   a service section disposed at the post section, the service section having a third opening and a fourth opening, wherein the third opening is juxtaposed the first opening and the fourth opening is juxtaposed the second opening, the service section further having a second terminal disposed proximate the third opening; and
   a neutral bus having a first end at the post section, a second end at the service section, and disposed passing through the second and fourth openings, the first end of the neutral bus being adapted to electrically connect with the supply neutral wire;

wherein the first and third openings are receptive of a jumper power conductor for providing electrical communication between the first and second terminals.

2. The service entrance of claim 1, wherein:
the first and second openings are disposed at a back surface of the post section;
the third and fourth openings are disposed at a back surface of the service section; and
the service section is disposed in a back-to-back rain-tight fashion with respect to the post section.

3. The service entrance of claim 1, wherein:
the second and fourth openings are disposed below the first and third openings.

4. The service entrance of claim 1, wherein:
the first terminal comprises a terminal block; and
the second terminal comprises a power connector; and
the terminal block is adapted to electrically connect with the supply power wire at one side and to electrically connect with an end of the jumper power conductor at another side, and the power connector is adapted to electrically connect with an opposite end of the jumper power conductor.

5. The service entrance of claim 4, wherein the terminal block is absent an electrical connection with the supply neutral wire, and the first and third openings are absent a jumper neutral wire.

6. The service entrance of claim 4, further comprising:
a first receptacle for an electric meter disposed at the service section, the first receptacle adapted for receiving power from the power connector;
a second receptacle for a load circuit disconnect disposed at the service section, the second receptacle adapted for receiving power from the first receptacle; and
a service neutral connector electrically connected with the neutral bus.

7. The service entrance of claim 6, further comprising:
a main circuit disconnect disposed at the service section and electrically connected between the first receptacle and the second receptacle.

8. The service entrance of claim 6, wherein the service neutral connector is disposed below the second receptacle.

9. The service entrance of claim 8, wherein:
the first and second openings are disposed at a back surface of the post section;
the third and fourth openings are disposed at a back surface of the service section; and
the service section is disposed in a back-to-back rain-tight fashion with respect to the post section.

10. The service entrance of claim 1, further comprising:
a service neutral connector electrically connected with the second end of the neutral bus;
wherein the service neutral connector is adapted to electrically connect with a return neutral wire from a load branch circuit; and
wherein the neutral bus provides a direct electrical connection between the return neutral wire from the load branch circuit and the supply neutral wire.

11. A service entrance, comprising:
a first housing and a second housing proximate thereto, the first and second housings having first and second openings disposed therebetween, the first housing having a first terminal disposed proximate one side of the first opening, the second housing having a second terminal disposed proximate the other side of the first opening, the first opening being receptive of a jumper power conductor for providing electrical communication between the first and second terminals; and
a neutral bus having a first end at the first housing, a second end at the second housing, and disposed passing through the second opening;
wherein the first housing is adapted to receive an electrical supply wire having a supply path and a return neutral path, the first opening is adapted to receive the supply path, and the second opening is adapted to receive the return neutral path.

12. The service entrance of claim 11, further comprising:
a terminal block disposed at the first housing and adapted to receive the supply path but not the return neutral path;
a first receptacle disposed at the second housing for receiving an electric meter, the first receptacle arranged for electrical communication with the terminal block;
a second receptacle disposed at the second housing for receiving a load circuit disconnect, the second receptacle arranged for electrical communication with the first receptacle.

13. The service entrance of claim 12, further comprising:
a main circuit disconnect disposed at the second housing and electrically connected between the first receptacle and the second receptacle; and
a service neutral connector disposed at the second housing and electrically connected with the neutral bus.

14. The service entrance of claim 13, wherein:
the first receptacle is disposed below the first opening;
the main circuit disconnect is disposed below the first receptacle;
the second receptacle is disposed below the main circuit disconnect; and
the service neutral connector is disposed below the second receptacle.

15. The service entrance of claim 14, wherein:
the second housing is arranged in a rain-tight fashion with respect to the first housing.

16. The service entrance of claim 11, further comprising:
a service neutral connector electrically connected with the second end of the neutral bus;
wherein the service neutral connector is adapted to electrically connect with a return neutral wire from a load branch circuit; and
wherein the neutral bus provides a direct electrical connection between the return neutral wire from the load branch circuit and the return neutral path of the electrical supply wire.

17. A service entrance, comprising:
a first section adapted to receive an electrical supply wire, the first section having a first opening and a second opening, and a first terminal disposed proximate the first opening; and
a second section capable of being attached to the first section, the second section having a third opening and a fourth opening, wherein the third opening is disposed to juxtapose the first opening and the fourth opening is disposed to juxtapose the second opening, the second section further having a second terminal disposed proximate the third opening;
wherein the first and third openings are receptive of a jumper power conductor for providing electrical communication between the first and second terminals; and
wherein the second and fourth openings are receptive of a neutral bus such that a first end of the neutral bus is disposed at the first section, and a second end of the neutral bus is disposed at the second section.

* * * * *